Figure 1:
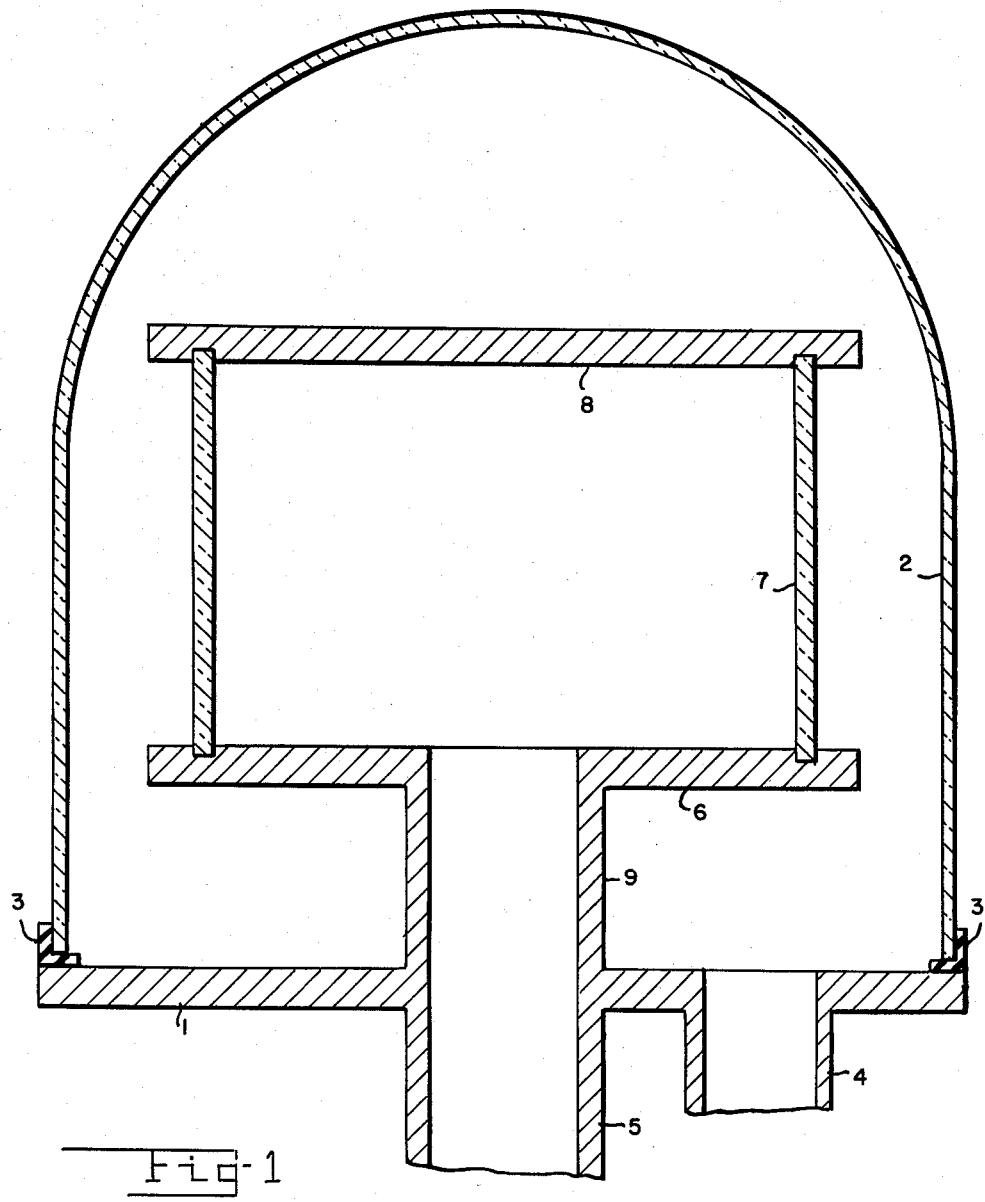

Aug. 4, 1964  S. E. DERBY  3,143,594
DEMOUNTABLE MULTIPLE STAGE ULTRA-HIGH VACUUM SYSTEM
Filed July 13, 1960  3 Sheets-Sheet 1

INVENTOR.
SAMUEL E. DERBY
BY
Orlando J. McCoy
ATTORNEYS

United States Patent Office 3,143,594
Patented Aug. 4, 1964

3,143,594
DEMOUNTABLE MULTIPLE STAGE ULTRA-HIGH VACUUM SYSTEM
Samuel E. Derby, 669 Marian Ave., Lima, Ohio
Filed July 13, 1960, Ser. No. 42,731
2 Claims. (Cl. 174—17)
(Granted under Title 35, U.S. Code (1952), sec. 266)

The invention described herein may be manufactured and used by or for the United States Government for governmental purposes without the payment to me of any royalty thereon.

This invention concerns a demountable, multiple stage, ultra-high vacuum apparatus and more particularly a multiple stage vacuum system with or without outgassing equipment positioned within the outer, high vacuum stage part of the equipment and operable from outside of the assembly in degassing and baking out the inner, ultra-high vacuum stage part of the equipment without breaking the vacuum seal.

High vacuum system equipment commonly comprises a bell jar with its open lower end resting on and making a vacuum-tight seal with a base through which the contents of the jar may be substantially completely evacuated of any air, vapor or the like that may be within the bell jar with a resultant pressure of about $10^{-5}$ mm. Hg remaining within the bell jar.

In ultra-high vacuum equipment that has been available heretofore heat has been used to clean the equipment of its residual gas content, which is commonly referred to as out-gassing or baking out the equipment. When prior ultra-high vacuum equipment has been used for running tests on electronic components such as targets, filaments, specimens and the like, the components and the tested articles are commonly exchanged between tests. In the prior equipment this exchange of the equipment undergoing test necessitated the opening or breaking of the glass or metal seals opening into the compartment containing the articles under test, changing the articles or specimens under test, resealing the glass or metal seals and then reevacuating the equipment preparatory to making additional tests. This procedure requires the services of a glass blower and entails a considerable expense in both time and materials each time the glass seals are opened and resealed. Where metal seals are used, new metal gaskets are preferred. Each time the seals are opened the joints must be checked and retightened after degassing. In using metal gaskets care is necessary to see that the gasket surfaces are highly polished and are not nicked when they are handled.

In outgassing previously available equipment, it has been necessary that the temperature to which the apparatus has been exposed be kept well below the softening point of the glass out of which the equipment is made since the ambient atmospheric pressure tends to collapse the glass as the temperature rises above its softening point.

The multiple stage apparatus that is disclosed herein is directed toward the provision of a new and unique multiple stage vacuum system equipment that provides an ultra-high vacuum compartment with pressures in the order of about $10^{-9}$ mm. Hg; which is quickly and easily demountable for making changes in its contents; and that provides a seal characterized by a non-unidirectional gas particle arresting path; and wherein the gaskets and seals may be reused without requiring the services of a glass blower in making glass to metal seals, ceramic to metal seals and the like that are vacuum tight.

Another object is to provide an ultra-high vacuum equipment that is provided with or without a heating element and its housing shell, which heating element is energized from outside the assembly without breaking the vacuum seal.

A further object is to provide a multiple stage, demountable ultra-high vacuum system apparatus that has an optimum freedom from vapors originating from greases, rubber and the like.

The multiple stage or compartmented, demountable, vacuum system apparatus that is disclosed herein comprises an outer, high vacuum stage of the bell jar type that is exhausted illustratively to a pressure of $10^{-5}$ mm. Hg inclosing an inner ultra-high vacuum stage of a cylindrical type exhausted to a pressure illustratively of $10^{-9}$ mm. Hg or less. The outer vacuum effectually protects the walls of the inner ultra-high vacuum compartment from the pressure of the ambient atmosphere. The apparatus is provided with and without a vacuum degassing heating element shell or heater that may be lowered down over the inner ultra-high vacuum chamber and that is energized from outside the assembly during the degassing operation. After the degassing operation the heating element bell is lifted up out of the way for the making of observations of the contents of the inner ultra-high vacuum chamber during a test run.

The equipment is extremely clean and is free from contaminating vapors such as those from rubber, greases and the like that are encountered in previous high vacuum equipment. On sputtering an electrically conducting target onto a low vapor pressure substrate, the purity of the noble gas atmosphere, such as argon, neon, krypton and xenon, or mercury vapor, assures freedom from contamination of the target. The use of quartz for the ultra-high vacuum chamber walls, insulators and the like permits even higher bake-out temperatures to be used, thus considerably reducing the bake-out time required to achieve clean, ultra-high vacuum equipment and prevents contamination from sodium and potassium ions which are present in glass and are released during degassing at temperatures above 350° C. The use of quartz for seals with metals heretofore has not been practical. The present invention makes the use of quartz to metal seals entirely practical since the seals are not fused together. Parts breakage from heat expansion and contraction is minimized since the seals are contact seals and are not fused.

Figure 2:
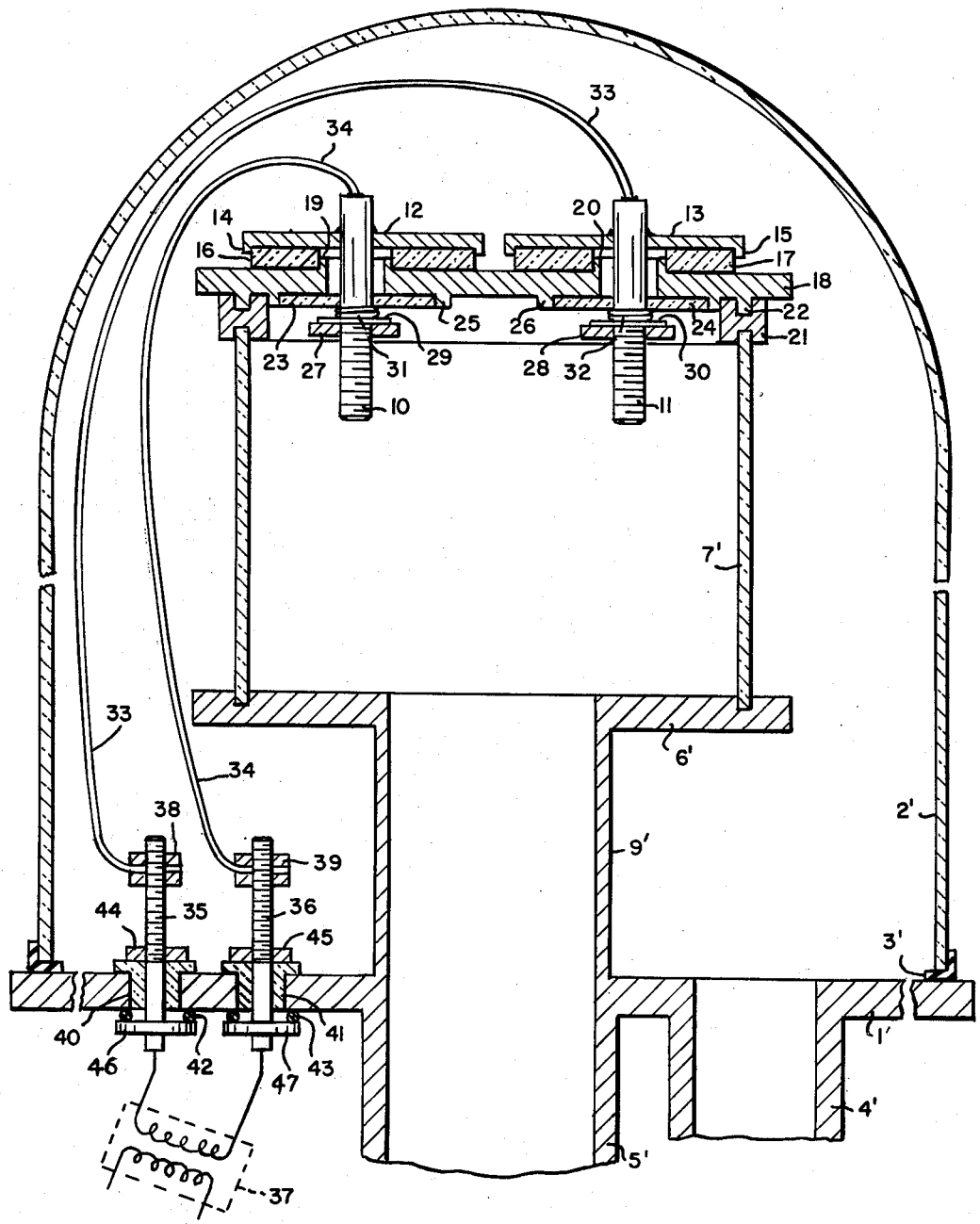
Figure 3:
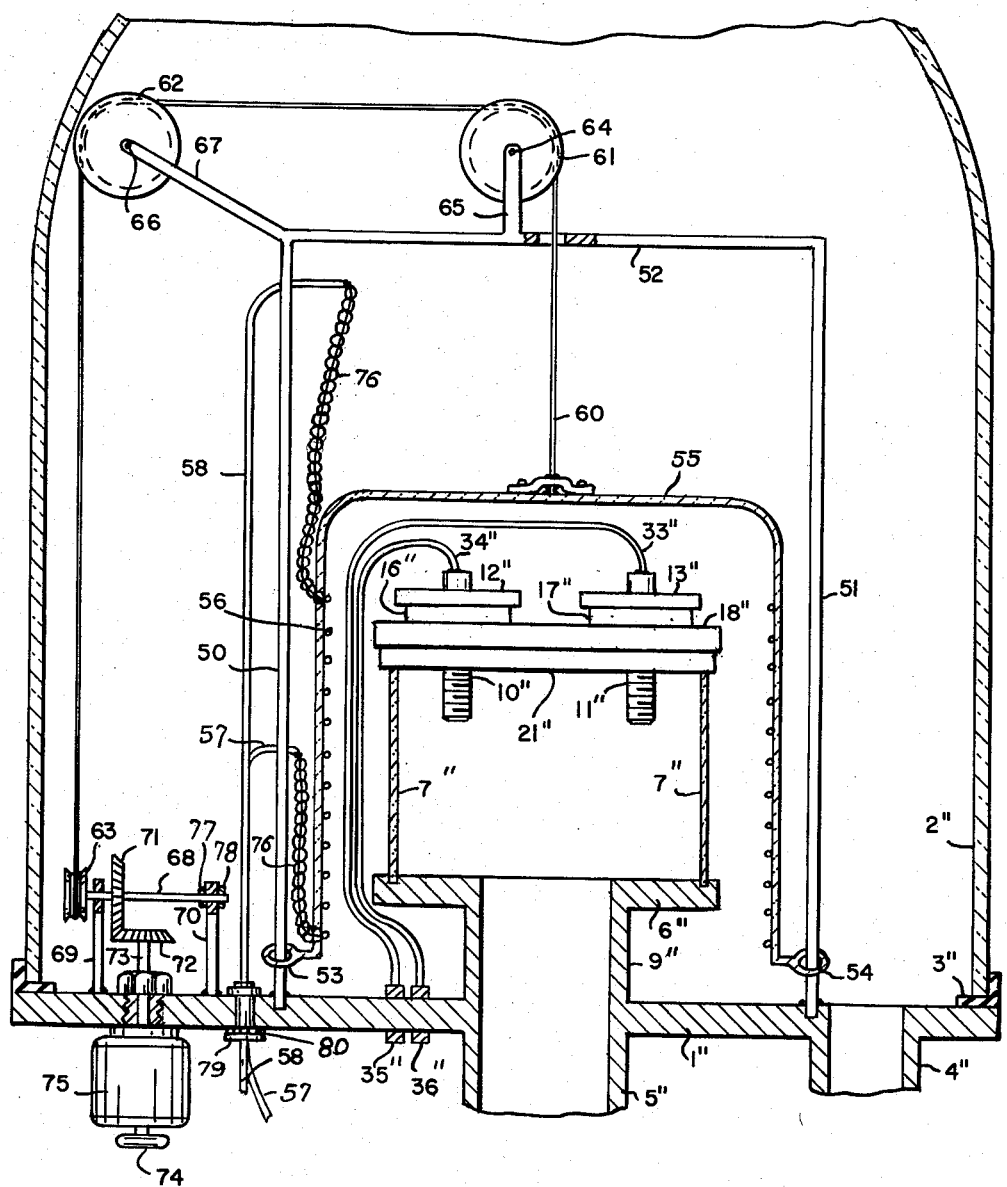

In the accompanying drawings:

FIG. 1 is an elevational view with parts broken away and in section of a multiple stage vacuum system apparatus that embodies the present invention;

FIG. 2 is an elevational view with parts broken away and in section of the apparatus in FIG. 1 equipped with electrical connections extending from outside of the assembly into the ultra-high vacuum innermost compartment with all seals maintained; and FIG. 3 is a diminished elevational view with parts broken away and in section of the apparatus shown in FIG. 2, inclusive of a degassing heating element addition thereto.

In FIG. 1 of the accompanying drawings is shown a high vacuum compartment base 1 that supports the edge of the open mouth of a glass bell jar 2, with a sealing gasket 3 disposed therebetween. The space within the bell jar 2, as closed by the base 1 and sealing gasket 3 is evacuated through a high vacuum exhaust port 4 that opens downwardly through the base 1 to a diffusion pump or the like that develops an illustrative pressure of $10^{-5}$ mm. Hg, or the like within the outer high vacuum chamber.

An ultra-high vacuum compartment is inclosed within the high vacuum compartment. The ultra-high vacuum compartment comprises a base 6 that is substantially parallel with the high vacuum compartment base 1. The ultra-high vacuum compartment base 6 is grooved in its upper face adjacent to its periphery to receive the lower edge of a cylindrical preferably quartz sidewall 7. A cap 8 is grooved in its lower face to receive the upper edge of the sidewall 7.

The ultra-high vacuum compartment base 6 is shown supported by a hollow cylindrical part 9 connected with the high vacuum compartment base 1. The hollow cylindrical part 9 preferably is made of a relatively low heat conductivity material such as stainless steel or the like. The hollow cylindrical part 9 is of as thin a section as is commensurate with supporting its superstructure for the purpose of minimizing heat conduction into the base 1 during a degassing operation that is described hereinafter.

The lower edge of the hollow cylindrical part 9 may, if preferred, make a shouldered slip fit, not shown, into the base 1 for interchangeability of the ultra-high vacuum chamber, manufacturing advantages or the like. The ultra-high vacuum compartment is evacuated through an ultra-high vacuum port 5 that opens downwardly through the base 1 to a trap and pump system, not shown, capable of producing an illustrative pressure of $10^{-9}$ mm. Hg or the like.

The metal parts of the dual compartmental apparatus in FIG. 1 are made of a suitable low vapor pressure, high melting point material for vacuum apparatus, such as of steel, nickel, copper or the like. The bell jar 2 and the cylinder 7 may be made of quartz, glass, stainless steel or other low vapor pressure materials. The gasket 3 may be made of a plastic such as tetrafluoroethylene polymer that is chemically stable and that is usable without decomposition over the temperature range of from $-75°$ C. to $+250°$ C., rubber or the like.

The seating of the upper and the lower edges of the preferably transparent cylinder 7 in the slots of the ultra-high vacuum inner compartment base 6 and the cap 8 are adequately snug to maintain the pressure differential and virtually to prevent the passage of gaseous molecules therethrough at the respective pressures within the apparatus.

The mean free path of gas particles at pressures of $10^{-5}$ mm. Hg and at $10^{-9}$ mm. Hg within both the high vacuum and the ultra-high vacuum compartments in FIG. 1 of the accompanying drawings prevents their passage therebetween. The particles of gas in the high vacuum compartment are prevented from passing into the inner-ultra-high vacuum compartment since the mean free path of the gas particles is extremely long as compared with the dimensions of any permissible cracks between the upper and lower edges of the cylinder 7 and the slots in the cap 8 or base 6 of the ultra-high vacuum compartment that is inclosed within the high vacuum compartment.

The criterion for the degree of vacuum necessary for preventing the migration of gas molecules between the high vacuum chamber and the ultra-high vacuum chamber is that the mean free path of the gas particles should exceed the dimensions of any apertures between the two chambers. This criterion is easily met since at the vacuum magnitude here considered the mean free path of the particles is approximately 15 feet.

The Handbook of Chemistry and Physics, 39th Edition, 1957–1958, published by the Chemical Rubber Publishing Co., Cleveland, Ohio, on page 3128 gives the mean free path of molecules in a vacuum of $1.5 \times 10^{-5}$ mm. Hg as $4 \times 10^{-2}$ cm. or 400 cm., which, taking 2.54 cm.=1 inch, the 400 cm.=158 inches or 13 feet. One of these molecules then can travel in a straight line for this distance unless it meets an obstruction from which it ricochets. At the evacuation of $1.5 \times 10^{-5}$ mm. Hg molecules carrying no electrical charge travel in straight lines and do not turn corners.

A modification of the two-stage vacuum in FIG. 1 is shown in FIG. 2 wherein corresponding parts bear corresponding reference numerals that are primed in FIG. 2. The device in FIG. 2 is adapted for evaporating films or developing a plasma for sputtering films of materials and then depositing the materials on a substrate, not shown, within the ultra-high vacuum inner chamber by means of a pair of electrical terminals 10 and 11 between which a filament which is used to produce the plasma or evaporate the material is connected.

The terminals 10 and 11 pass through and are welded adjacent to their upper ends to the centers of the discs 12 and 13. The discs 12 and 13 terminate along their peripheries in downwardly extending flanges 14 and 15 respectively. The flanges 14 and 15 are of adequate height to engage and to overlie for about one-half the thickness of the edges of the ring insulators 16 and 17 respectively and thereby reflect, rather than permit the direct passage therebetween of gas particles.

In a corresponding way the ultra-high vacuum chamber cover plate 18 has upwardly extending flanges 19 and 20 that engage and overlie the edges of the ring insulators 16 and 17 respectively. The plate 18 is apertured for the passage therethrough of the feed-throughs 10 and 11, and preferably is well spaced therebetween, so that no electrical conduction can occur therebetween.

The ultra-high vacuum chamber cover plate 18 is supported adjacent to its periphery by a low vapor pressure metal ring 21. The ring 21 has an upwardly opening groove in its upper face to receive a downwardly extending flange or rib 22 from the cover plate 18 and a downwardly opening groove in its lower face to receive the upper edge of the cylindrical chamber wall 7'.

The pair of terminals 10 and 11 are maintained centrally of the spaces through the cover plate 18 by a pair of insulators 23 and 24 that seat snugly within ring flanges 25 and 26 that extend downwardly from the lower face of the cover plate 18. The assembly is secured together by nuts 27 and 28 and washers 29 and 30 that hold coil springs 31 and 32 under compression against the insulators 23 and 24, respectively throughout.

The pair of terminals 10 and 11 have their upper ends silver soldered, welded or otherwise connected electrically and attached to bare copper wires 34 and 33 respectively. Another pair of feed-throughs 35 and 36 feed electrical energy through the base 1' from an outside power source, such as from a transformer 37 or the like. The wires 33 and 34 are designed to carry and to deliver to the terminals 10 and 11 illustratively 12 volts and 500 amps in the ultra-high vacuum inner compartment.

The pressures here concerned are such that the mean free path of gas particles is long as compared with the space between the bare wires 33 and 34 and hence the formation of a discharge or an arc between the wires 33 and 34 is prevented. The mean free path of gas particles is long as compared with any FIG. 2 spaces between the seals 6' and 7', and 21, 21 and 22, 17 and 20, 17 and 15, 16 and 19, 16 and 14 and the like and hence practically no gas particle migration occurs through these spaces and seals.

The lower ends of the leads 33 and 34 that are remote from their upper ends that are attached to the terminals 10 and 11, are connected to the lead-throughs 35 and 36 by being secured thereto between pairs of jam nuts 38 and 39 that thread on the inner ends of the lead-throughs, by alligator clips or the like. The lead-throughs 35 and 36 are mounted in the assembly by being passed from the outside through apertures in the base 1' with capped insulators 40 and 41 of glass, porcelain or the like therebetween and with O-rings 42 and 43 of rubber, plastic or the like maintaining sealing relation between the lower flanges 46 and 47 and the outer surface of the base 1'. Nuts 44 and 45 thread on the lead-throughs 35 and 36 inside of the outer, high vacuum compartment. The outer, high vacuum compartment is evacuated through the port 4' and the inner, ultra-high vacuum compartment is evacuated through the port 5'.

FIG. 3 illustrates equipment such as that shown in FIGS. 1 and 2 provided with a degasser heater for baking out the ultrahigh vacuum chamber. Parts in FIG. 3 that are comparable with parts in FIGS. 1 and 2 are double primed in FIG. 3.

The degasser is a heater that is mounted for vertical movement within a cage that comprises a guide support with a desired plurality, such as four, of upright rods 50, 51 etc., that have their lower ends attached to the base 1" by welding or the like. The upright rods 50, 51 etc., support at their upper ends a plate 52 by being welded thereto or the like. Two or more of the upright rods 50, 51 etc., serve as vertical guides for the degassing heater by means of rings 53 and 54 that encircle the rods and that are attached mechanically to the cup-shaped heater housing or shell 55.

The heater housing or shell 55 preferably is made of chromium plated metal to the inner surface of which is bonded a ceramic form to which the heating element 56 is attached. The ultra-high vacuum chamber is baked out by radiant heat. The heating element 56 is illustratively tungsten or molybdenum wire. The lowermost position of the degasser heater should be spaced about one-half inch above the upper surface of the base 1" to permit the free-flow of gas therebetween during degassing operations. The heating element 56 is connected by welding or the like to outside the heater assembly by the two bus bars 57 and 58 that pass through the base 1" by suitable electrical feed-throughs 79 and 80 that are comparable to the feed-throughs 35 and 36 that are shown in more detail in FIG. 2.

The external portions of the heating element wire 56 preferably are insulated against accidental contact with metal members of the assembly by suitable means such as by a plurality of ceramic bead insulators 76 that are threaded on the wire between the points at which the wire ends are welded to the bus bars 57 and 58 and their entrance locations within the heater shell 55.

The vertical travel of the degasser heater from around the ultra-high vacuum compartment is accomplished from outside the assembly by means of a cable 60 that is attached by welding or the like to the center of the heater housing top. The cable 60 passes upwardly over a first pulley 61, then laterally over a second pulley 62 and then downwardly where its end, remote from the heater, is attached to a cable winding drum 63 that is operated from outside the assembly. The pulley 61 is journalled on a shaft 64 that extends between a pair of bifurcated arms 65 with their lower ends welded to the top of the plate 52. The pulley 62 similarly is journalled on a shaft 66 that is mounted between a pair of bifurcated arms 67 that extend from and are welded to the plate 52.

The cable winding drum 63 is shown mounted on a shaft 68 that is journalled between a pair of supports 69 and 70 that extend upwardly from and that have their lower ends welded to the upper face of the base plate 1". Axial travel of the shaft 68 is arrested by suitable means such as by the collars 77 and 78 on opposite sides of the support 70, or the like. The cable drum 63 is turned through a gear train represented by the gears 71 and 72 and the shaft 73 from a rotating vacuum feed-through 75 that is controlled by the operation of its knob 74 that is disposed outside of the assembly.

The rotating vacuum feed-through 75 is obtained commercially as the rotary bellows seal type 1301 for high vacuum from the National Research Corporation, Newton 61, Massachusetts, or as the rotary bellows seal 1, type 10, from the Kearfott Engineering Company, 117 Liberty Street, New York City 6, New York. The rotating vacuum feed-through 75 transmits rotary motion from the ambient atmosphere into the vacuum without leakage at the vacuum magnitudes contemplated hereby. The outer high vacuum compartment is exhausted through the port 4". The inner, ultra-high vacuum compartment is exhausted through the port 5".

The exhaustion through the port 4' to a vacuum of $10^{-5}$ mm. Hg effectually and continuously removes the rapidly diffusing and highly permeating fractions of the atmosphere such as hydrogen and helium, to such an extent that the inwardly positioned ultra-high vacuum compartment that is disclosed herein, when at $10^{-9}$ mm. mercury vacuum has an optimum freedom from these gases.

Quartz is preferred to glass in the construction of the ultra-high vacuum parts of the apparatus that is disclosed herein. Glass contains sodium and potassium which are driven out of its structure during degassing operation above 350° C. The sodium and potassium are released in the form of ions which may not be removed by the vacuum pumps but tend to be absorbed on or may react with metal surfaces of parts of the apparatus. These ions contaminate the clean metal parts and prevent the attainment of atomically clean surfaces.

The described structure and operation of the invention that is disclosed herein is submitted as an illustrative operative concept of the present invention and with the understanding that comparable modifications and changes may be made therein without departing from the scope of the present invention.

I claim:

1. A multiple stage apparatus that is easily demountable and that consists of a high vacuum compartment enclosing an ultra-high vacuum compartment that are both separately evacuated up to in the order of $10^{-9}$ mm. mercury, the high vacuum compartment comprising a high vacuum stage base, a high vacuum stage bell jar terminating downwardly in an open mouth defined by an edge that makes sealing engagement with the base to provide a high vacuum stage compartment within the bell jar, the ultra-high vacuum stage compartment within the high vacuum stage compartment comprising an ultra-high vacuum stage base provided with an upwardly opening groove extending continuously along and disposed inwardly from the peripheral edge of the ultra-high vacuum stage base, an ultra-high vacuum stage cylinder with its lower edge positioned in the ultra-high vacuum stage base groove to provide a gas particle arresting seal therewith, a cover plate overlying the top of said ultra-high vacuum stage cylinder and having a rib extending downwardly toward the cylinder from the lower side of the cover plate, a ring interposed between the upper edge of the ultra-high vacuum stage compartment cylinder seated in a groove extending continuously of the lower side of the ring and the ring grooved along its upper side continuously to receive in sealing relation the downwardly extending rib on the lower surface of the cover plate, in gas particle sealing relation therewith, and a pair of electrical terminals accessible for experimentation within the ultra-high vacuum stage compartment and insulated from each other and in sealing relation with and extending through the cover plate, and electrical conducting means separately connecting the terminals to outside of the multiple stage high vacuum apparatus.

2. A multiple stage easily demountable, high vacuum apparatus comprising a high vacuum stage base, a high vacuum stage bell jar terminating downwardly in an open mouth defined by an edge that makes sealing engagement with the base to provide a high vacuum stage compartment within the bell jar, means through which the high vacuum stage compartment is exhausted, an ultra-high vacuum stage compartment within the high vacuum stage compartment and comprising an ultra-high vacuum stage base with an upwardly opening groove inwardly from the peripheral edge thereof, an ultra-high vacuum stage cylinder with its lower edge positioned in the ultra-high vacuum stage base groove to provide a gas particle arresting seal therewith, an ultra-high vacuum stage cap with a downwardly opening groove inwardly from its edge in which groove is positioned the upper edge of the ultra-high vacuum stage cylinder to provide a gas particle arresting seal therewith, and means centrally of and structurally continuously integral with both the high vacuum stage base and the ultra-high vacuum stage base through which the ultra-high vacuum stage compartment is exhausted, and inclusive of a degasser heater provided with a heating coil and adapted for being removably positioned around the ultra-high vacuum stage inner compartment for degassing operations, and means for raising and lowering the degasser heater from around the ultra-high vacuum stage inner compartment from outside the assembly without modifying the degree of vacuum within either the high vacuum stage outer compartment or the ultra-high vacuum stage inner compartment.

References Cited in the file of this patent

UNITED STATES PATENTS

| | | |
|---|---|---|
| 1,488,613 | Pickard | Apr. 1, 1924 |
| 2,194,300 | Found | Mar. 19, 1940 |
| 2,227,829 | Hansell | Jan. 7, 1941 |
| 2,367,331 | Bondley | Jan. 16, 1945 |
| 2,858,356 | Setchell | Oct. 28, 1958 |
| 2,975,330 | Bloom et al. | Mar. 14, 1961 |